United States Patent
Bosbach et al.

(10) Patent No.: US 11,554,573 B2
(45) Date of Patent: Jan. 17, 2023

(54) PLASTIC FIBER COMPOSITE MATERIAL/ALUMINUM LAMINATE, PRODUCTION AND USE THEREOF

(71) Applicants: Christian-Albrechts-Universitaet zu Kiel, Kiel (DE); Technische Universitaet Hamburg-Harburg, Hamburg (DE)

(72) Inventors: Bjoern Bosbach, Hamburg (DE); Bodo Fiedler, Hamburg (DE); Melike Baytekin-Gerngross, Kiel (DE); Mark-Daniel Gerngross, Kiel (DE); Juergen Carstensen, Kiel (DE); Rainer Adelung, Kiel (DE)

(73) Assignee: Christian-Albrechts-Universitaet zu Kiel, Kiel (DE)

( * ) Notice: Subject to any disclaimer, the term of this patent is extended or adjusted under 35 U.S.C. 154(b) by 34 days.

(21) Appl. No.: 16/638,822

(22) PCT Filed: Aug. 16, 2018

(86) PCT No.: PCT/DE2018/100717
§ 371 (c)(1),
(2) Date: Feb. 13, 2020

(87) PCT Pub. No.: WO2019/034211
PCT Pub. Date: Feb. 21, 2019

(65) Prior Publication Data
US 2020/0180273 A1   Jun. 11, 2020

(30) Foreign Application Priority Data
Aug. 18, 2017   (DE) .................... 10 2017 118 940.8

(51) Int. Cl.
*B32B 15/14*   (2006.01)
*B32B 3/06*   (2006.01)
(Continued)

(52) U.S. Cl.
CPC ............. *B32B 15/14* (2013.01); *B32B 3/06* (2013.01); *B32B 15/20* (2013.01); *B32B 37/12* (2013.01);
(Continued)

(58) Field of Classification Search
CPC   B32B 15/14; B32B 3/06; B32B 15/20; B32B 37/12; B32B 38/10;
(Continued)

(56) References Cited

U.S. PATENT DOCUMENTS

| | | | | |
|---|---|---|---|---|
| 5,403,653 A | * | 4/1995 | Moreton | B32B 15/08 428/300.4 |
| 2009/0017242 A1 | * | 1/2009 | Weber | C23F 1/16 428/35.7 |

(Continued)

FOREIGN PATENT DOCUMENTS

| | | |
|---|---|---|
| DE | 102016102379 B3 | 11/2016 |
| DE | 102016113641 A1 | 1/2018 |

(Continued)

OTHER PUBLICATIONS

International Search Report dated Nov. 26, 2018, in International Application No. PCT/DE2018/100717.
(Continued)

*Primary Examiner* — Alicia J Sawdon
*Assistant Examiner* — Laura B Figg
(74) *Attorney, Agent, or Firm* — Patent Central LLC; Stephan A. Pendorf (57) ABSTRACT

A plastic fiber composite material/aluminum laminate having: at least one flat element made of aluminum and/or an aluminum alloy and a plastic fiber composite material comprising a matrix material which has a temporarily flowable and then hardened state initially or at least under a temperature effect. The at least one flat element has etched anchoring
(Continued)

structures, the anchoring structures have steps and undercuts, and the anchoring structures are filled and/or enclosed by the matrix material of the plastic fiber composite material. Use of the plastic fiber composite material/aluminum laminate and a method for producing the plastic fiber composite material/aluminum laminate.

11 Claims, 4 Drawing Sheets

(51) Int. Cl.
    *B32B 15/20*     (2006.01)
    *B32B 37/12*     (2006.01)
    *B32B 38/10*     (2006.01)

(52) U.S. Cl.
    CPC ........ *B32B 38/10* (2013.01); *B32B 2260/021* (2013.01); *B32B 2260/046* (2013.01); *B32B 2262/101* (2013.01); *B32B 2262/106* (2013.01); *B32B 2307/542* (2013.01); *B32B 2605/18* (2013.01)

(58) Field of Classification Search
    CPC ........ B32B 2260/021; B32B 2260/046; B32B 2262/101; B32B 2262/106; B32B 2307/542; B32B 2605/18
    See application file for complete search history.

(56) References Cited

U.S. PATENT DOCUMENTS

| | | | |
|---|---|---|---|
| 2010/0098910 A1 | 4/2010 | Naritomi et al. | |
| 2016/0333227 A1* | 11/2016 | Andoh | B29C 66/72141 |
| 2019/0040532 A1 | 2/2019 | Baytekin-Gerngross et al. | |
| 2019/0264346 A1 | 8/2019 | Gerngross et al. | |

FOREIGN PATENT DOCUMENTS

| | | |
|---|---|---|
| EP | 1559542 A1 | 8/2005 |
| EP | 1767343 A1 | 3/2007 |
| EP | 2298525 A1 | 3/2011 |
| EP | 2993023 A1 | 3/2016 |
| EP | 3023244 A1 | 5/2016 |
| GB | 2253185 A | 9/1992 |

OTHER PUBLICATIONS

Cepeda-Jimenez, C.M. et al., "Influence of the alumina thickness at the interfaces on the fracture mechanisms of aluminium multilayer composites", Materials Science and Engineering A 496 (2008), Elsevier, Amsterdam, NL, vol. 496, Nr: 1-2, pp. 133-142, XP025432761.

* cited by examiner

PLASTIC FIBER COMPOSITE MATERIAL/ALUMINUM LAMINATE, PRODUCTION AND USE THEREOF

The invention relates to a plastic fiber composite material/aluminum laminate comprising at least one flat body made of aluminum and/or an aluminum alloy and a plastic fiber composite material with a matrix material which has a flowable state at least initially or under the influence of temperature, and then a hardened state. Further, the invention concerns the use of a fiber composite material/aluminum laminate as a mechanically strong lightweight material.

Especially in aircraft construction, lightweight materials are used to reduce weight while improving mechanical rigidity and strength compared to aluminum as a light metal. Fiber composite materials made of a polymer as a matrix material with conventionally oriented fibers made of glass or carbon embedded therein are correspondingly suitable for this. The polymers can be thermosets, thermoplastics or elastomers, with epoxy resins being particularly widely employed.

Notwithstanding, it is pointed out that this invention can find application in other areas, such as the automotive industry, wind power generation or construction in general.

A disadvantage of fiber composite materials, however, is their brittle behavior towards impact damage. The energy introduced by an impact cannot be dissipated by the fiber composite material by local deformation alone, but often creates extensive cracks and detachments of the fibers from the matrix along the entire structure. Such damage is often hardly recognizable without extensive examination, so that even a small impact damage to the surface of a structure, which need not be visible to the naked eye, can lead to the total failure of the structure under renewed mechanical stress. In general, compressive loads are much more critical than tensile loads.

Due to their elastic and plastic mechanical properties, metals are significantly less susceptible to impact damage, and forces can be introduced much more easily. But even light metals are used less and less, for example in aircraft construction. because of their higher weight compared to plastics. One of the best known attempts to use the good mechanical properties of metals in a lighter weight variant is Glass Laminate Aluminum Reinforced Epoxy (GLARE), which, however, has not achieved success due to the problem of poor adhesion between the metal and plastic layers in aircraft construction that has not yet been solved.

Laminates made of GFRP ("glass fiber reinforced polymer", GFRP) and aluminum are described, for example, in the publications GB 2253185 A and EP 1767343 A1. Such laminates have also been extensively examined for their behavior under "mechanical impact" in recent years, for example by Cepeda-Jiménez et al. "Influence of the alumina thickness at the interfaces on the fracture mechanisms of aluminum multilayer composites", Material Science and Engineering A 496 (2008), pp. 133-142 or by Morinière et al., "Damage evolution in GLARE fiber-metal laminate under repeated low velocity impact tests", Cent. Eur. J. Eng. 2 (4), 2012, pp. 603-611 or by Jakubczak et al., "The impact behavior of aluminum hybrid laminates", Aircraft Engineering and Aerospace Technology: An International Journal, Vol. 86 (4), 2014, p. 287-294.

In all studies known to date, it was found that the relatively low adhesion of the metal layers to the fiber composite material layers results in delamination at the interfaces between the layers. All measures to improve the chemical bond between metal and fiber composite material, for example by anodizing aluminum and additional adhesion promoters, have not fundamentally solved the problem. Either the weakening of the laminate by the low matrix-metal adhesion must be accepted, or it is laminated in such thin metal foils that the foils themselves tear before the adhesion between metal and fiber composite material fails.

To create a crack with an inner surface A one needs the energy $2\gamma A$, where $\gamma$ is the specific binding energy. The very low specific binding energy $\gamma_{MK}$ between metal and fiber composite material compared to the metal $\gamma_{MM}$ is therefore compensated for in very thin foils by keeping the cross-sectional area A in the metal foil very small and therefore breaking it with the appropriate energy input.

The problem of detachment of the metal from the fiber composite material has been regarded as one of the main causes of the structural failure of fiber composite material-metal laminates. Typical processing steps such as drilling and milling often lead to the delamination described above, which is why the rejection rate during the production of corresponding components is very high and make an expensive and time-consuming final inspection unavoidable.

For optimal force introduction into a fiber composite material, relatively thick (typically more than 100 μm) metal foils with a relatively large (typically several $cm^2$) area are necessary, which, however, could not be suitably embedded in laminate due to the ease of delamination.

Figure 1:
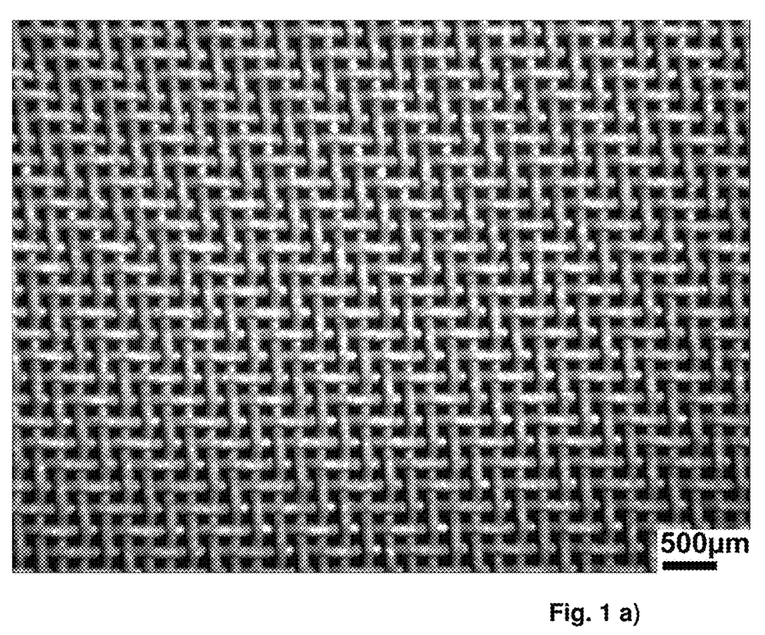
Figure 4:
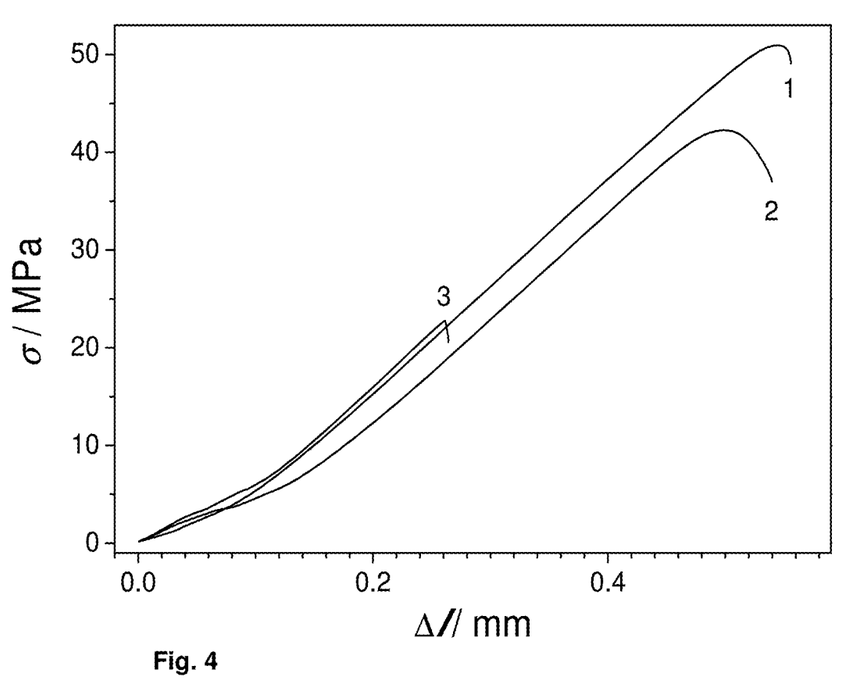
FIG. 4 measurement curves of an ASTM D-3846-08 test for (1) GFRP, (2) a laminate of GFRP and a wire mesh made of AlMg5 as in FIG. 1 *a*) and (3) a laminate of GFRP and a perforated plate made of AlMg3 as in FIG. 1 *b*), fibers aligned along the application of force (0° orientation)

As a hitherto unpublished—only moderately successful—remedy for relieving the force at the metal-fiber composite interfaces, it was considered to design the metal layers perforated. FIG. 1 a) shows, for example, a wire mesh made of metal, through the mesh of which the matrix material of the fiber composite material can form bridge connections on both sides of the mesh in the laminate. The metal foil provided with holes in FIG. 1 b) serves the same purpose. The permeability of the metal layers can be given as the ratio of the total cross-sectional areas of the holes to the metal layer area. It is 28% in FIG. 1 a) and 23% in FIG. 1 b). As FIG. 4 shows, a higher interlaminar shear strength is actually experimentally detectable for perforated metal layers, with a higher permeability also showing a higher shear strength. With the onset of adhesive failure of metal and fiber composite material, however, the metal layers in the area of detachment under mechanical load act like local knives, which then cut through the matrix material bridges.

"Sculpturing" Method

The sculpturing method known in the prior art involving electrochemical etching is explained below, the disclosure according to the following publication being incorporated by reference.

In patent DE 10 2016 102 379 B3, small fragments of aluminum or aluminum alloy, which are not nanoparticles and are usually also larger than microparticles, are to be embedded in a polymer matrix in order to produce a composite with, inter alia, improved mechanical properties. For this purpose, the fragments, referred to as aluminum small bodies, are structured with a chemical etching attack in an etching bath over their entire surface while the etching solution is continuously circulated in such a way that the small bodies are entrained by the movement of the etching solution. The structuring itself is carried out by an etching attack with a non-storage-stable etching solution, which is provided by a preceding inoculation step. This is necessary to maintain the shape of the small bodies, since otherwise they would be deformed or even destroyed due to their small dimensions without simultaneous etching of the entire surface.

The structures achieved on the surfaces of the small bodies show a strongly hierarchical, tapering shape consisting of cubic elements of different sizes and areas with free volume, which are often covered by the cubic aluminum structures. In this publication FIG. 1 shows a schematic cross section of the anchoring structures that can be achieved by etching perpendicular to the etched aluminum surface. Since the remaining aluminum structures sometimes remind one of cubes stacked on top of one another with protrusions of different strengths that form a confusing sculpture, the researchers and inventors of the DE 10 2016 102 379 B3 publication describe the production of such anchoring structures from a metal block with the term "sculpturing".

The publication DE 10 2016 102 379 B3 teaches that the mixing of small aluminum bodies coated with anchoring structures with an initially flowable and then hardening material leads to a composite after hardening, which in any case can not be destroyed or disassembled due to a failure of chemical adhesion of the aluminum to the material. However, these small aluminum bodies are generally not suitable for efficiently transferring forces into the workpiece over large distances—for example, several millimeters.

In the publication DE 10 2016 113 641.7, which was still unpublished at the time of registration or priority, an electrochemical method for producing anchoring structures on aluminum is also presented. For the electrochemical etching of steps and undercuts, a salt water solution is used as the etching electrolyte, containing table salt (NaCl) with a concentration in the interval from 200 mmol/l to 800 mmol/l and sodium sulfate (Na2SO4) with a concentration of 5 mmol/l up to 100 mmol/l. By setting up an etching current density in the range between 10 mA/cm$^2$ and 100 mA/cm$^2$ and an etching bath temperature between 10° C. and 40° C., an advantageous reaction kinetics can be achieved with the etching electrolyte, which leads to the sculpturing of the aluminum.

The working group of the inventors of the publications DE 10 2016 102 379 B3 and DE 10 2016 113 641.7, has also published the article Baytekin-Gerngross et al., "Making metal surfaces strong, resistant, and multifunctional by nanoscale-sculpturing", Nanoscale Horiz., 2016, 1, 467. The "Supplementary Information" shows that, for example, the aluminum alloys AA1050, AA5754 and AA6060 can be etched in a bath with an aqueous etching solution containing 7.25 wt. % HCl after degreasing in acetone to form anchoring structures to the surface. Furthermore, it is known from the prior art to etch surface structures in aluminum alloys, as described, for example, in US 2016/0333227 A1, deliberately forming simple structures which are open at the top in order to achieve a better connection.

Furthermore, US 2010/0098910 A1 discloses a laminate made from an aluminum alloy and plastic fiber composite material, in which a very firm connection is already established between a surface of the aluminum alloy processed by means of an etching process and the plastic fiber composite material, anchoring structures being etched into the surface of the aluminum alloy, wherein these anchoring structures are simple depressions or projections.

The object of the present invention is to propose a plastic fiber composite material/aluminum laminate and a production method which does not have the problems of the known laminates and which has improved performance features in comparison to the laminates known in the prior art, in particular with the aim of producing even more capable laminates.

The object is achieved by a plastic fiber composite material/aluminum laminate according to the main claim and a plastic fiber composite material/aluminum laminate manufacturing method according to the independent claim as well as a use of the plastic fiber composite material/aluminum laminates.

The plastic fiber composite material/aluminum laminate has:
at least one flat body made of aluminum and/or an aluminum alloy
as well as
a plastic fiber composite material with a matrix material that has an initially temporarily flowable state, at least under the influence of temperature, and then a hardened state,
wherein the flat body and the plastic fiber composite material have at least a common composite surface and are connected to one another via this common composite surface,
wherein the at least one flat body has chemically and/or electrochemically etched anchoring structures at least on all common composite surfaces to the plastic fiber composite material, and wherein the anchoring structures have steps and undercuts, the anchoring structures being filled and/or enclosed by the matrix material of the plastic fiber composite material.

In particular, the anchoring structures can be formed by the sculpturing process, for which purpose reference is made to the embodiments of sculpturing disclosed in the introduction.

Furthermore, the anchoring structures can in particular be designed in such a way that they have a shape that tapers to the surface and/or consist of cubic element sections of different sizes and/or have areas with free volume that are often covered by cubic aluminum structures, wherein these structures in particular are or can be produced by sculpturing.

In regard to the method, the plastic fiber composite material/aluminum laminate-manufacturing method comprises the following steps:
a) providing a flat body made of aluminum and/or an aluminum alloy;
b) processing at least one surface of the flat body into a composite surface by etching using a sculpturing method for producing etched anchoring structures in the at least one composite surface of the flat body;
c1) applying a matrix material of a plastic fiber composite material, which is initially flowable or at least temporarily under the influence of temperature, for the production of the laminate on the at least one composite surface, the matrix material of the plastic fiber composite material filling and/or enclosing the anchoring structures, or
c2) applying an initially flowable adhesive and then curing on the at least one composite surface and then, before the adhesive has hardened, applying a prefabricated, hardened laminate.

Further advantageous embodiments can be found in the further subclaims:

The flat body can be arranged on the outside and/or inside of the laminate.

At least one flat body may be provided arranged within the plastic fiber composite substance.

The flat body can be disposed between layers of the plastic fiber composite material which is comprised of a layer structure.

When force is introduced into the plastic fiber composite material/aluminum laminate, a failure of the matrix material or the fiber matrix bond of the fiber composite material can be observed under mechanical load before the fiber composite material is detached from the at least one flat body. The adhesion at the interface of the inventive plastic fiber composite material/aluminum laminate is always higher than the shear strength/tensile strength of the plastic or the shear strength/tensile strength of the aluminum or aluminum alloy.

The flat body made of aluminum or aluminum alloy may, in particular, have a volume greater than 1 cubic centimeter and a thickness of at least 30 micrometers, preferably at least 100 micrometers, particularly preferably at least 500 micrometers.

Furthermore, the plastic fiber composite material/aluminum laminate can have:
 at least one flat body made of aluminum and/or an aluminum alloy,
and
 a plastic fiber composite material, wherein the matrix material is in a flowable state at least temporarily during production of the fiber composite material/aluminum laminate and after production achieves a hardened state,
wherein the flat body and the plastic fiber composite material have at least a common bond area, characterized in that the flat body has etched anchor structures at least at all interfaces to the plastic fiber composite material, wherein the anchoring structures are enclosed by the matrix material of the plastic fiber composite material.

The improvement in the mechanical properties of the known aluminum-small body-plastic composite is based on the suppression of essential failure mechanisms in the plastic, such as stopping cracks spreading in the plastic on the aluminum small bodies. In order to transfer these advantages to a laminate according to the preamble, the invention now provides aluminum flat bodies with anchoring structures of the type described above and then to use them as separate metal layers ("plies") for producing the laminate.

Flat aluminum objects made of aluminum or an aluminum alloy with two extended flat sides are to be referred to here as flat objects, for example a foil or a solid sheet or a wire mesh or a perforated foil or a perforated plate. Such a flat body should preferably have a volume greater than 1 cubic centimeter and a minimum thickness of 30 micrometers, so that it has at least a lateral extent of several millimeters to a few centimeters. A much larger volume than 1 cubic centimeter is also possible, for example the flat body can be a sheet of 1 millimeter thick with length and width in the meter range. A flat body according to the invention has etched anchoring structures of the type described above, at least on its two flat sides, preferably without gaps. The flat bodies are, by definition, self-supporting objects which can be processed separately.

The anchoring structures can be produced on surfaces made of aluminum and aluminum alloys using the processes named in the prior art. For use in laminates, relatively large flat bodies with a large area are advantageous, so that electrochemical etching is preferred. Purely chemical etching of the structures is also possible.

Laminates according to the invention can in particular be those which only comprise an aluminum flat body. It is also possible to design the laminate so that the aluminum flat body forms one of the outer sides of the laminate Likewise, the top and bottom of a laminate according to the invention can each be formed from an aluminum flat body, the laminate having further layers of fiber composite material arranged between the top and bottom.

Furthermore, the aluminum flat bodies provided on the outside and/or inside can also have a corresponding structure on their side opposite the plastic fiber composite material, so that any finish and the like to be applied experiences perfect adhesion.

A plastic fiber composite material/aluminum laminate or fiber composite aluminum laminate according to the invention is formed, for example and preferably, by laminating at least one aluminum flat body equipped with anchoring structures on both sides with a plurality of layers of a fiber composite material surrounding the flat body. The individual layers of fiber composite material can be, for example, prefabricated mats made of fibers arranged next to one another in a polymer matrix, which are commercially available in this form. The fiber composite material is preferably a glass fiber reinforced and/or a carbon fiber reinforced epoxy resin. The mats with fibers have a predetermined fiber orientation. They can be aligned with respect to a predetermined direction of force application into the laminate, for example along the force application direction—"0° orientation", "+45° or −45° orientation"—or perpendicularly to this—"90° orientation".

With regard to the production of the matrix composite of the plastic fiber composite material/aluminum laminate, there can be used the prepreg tape laying process as well as the known RTM, resin transfer molding, process, wherein liquid plastic is used in the RTM process and in the prepreg process resin systems are used that are initially ductile and pass into the liquid phase during the manufacturing process before they then harden.

According to the claims and the textual description, the prepreg process or the RTM process is explicitly included in the production of laminates according to the invention, i.e. an initially flowable and then hardening matrix material is also to be understood as a prepreg tape, which is appropriately positioned by means of a tape applicator and only becomes quasi-flowable in the actual baking/manufacturing step and ultimately hardens through the appropriate addition of thermal energy. The application of a matrix material which is at least initially flowable, or at least under the influence of temperature, and then cures, means that the matrix material must be flowable at least at one point in time during the production process, but not all of the time.

As in the prior art, the laminates are formed by stacking mats and flat bodies. For example, the matrix material of the mats is introduced in flowable form as a binder between the individual layers, for example injected, and then chemically or thermally cured. The mats can also be chemically or thermally softened on their flat sides, whereupon the scrim can be pressed into the laminate under pressure. The methods for producing a laminate with any predetermined stacking sequence of layers of a fiber composite material, which can also be aligned parallel or differently, with metal layers, for example foils, embedded between them are known per se.

A laminate according to the invention arises precisely when flat bodies made of aluminum or aluminum alloy with anchoring structures on their surface are used as metal layers during the lamination process.

The adhesion between metal and fiber composite material then proves to be extremely good. The flat bodies are advantageously not limited in terms of their thickness, but can also be designed to be particularly strong mechanically in order to allow a far-reaching introduction of force. The aluminum flat bodies preferably have a thickness greater than 100 micrometers, particularly preferably greater than 500 micrometers.

A particular special case of the invention can also be seen in that the plastic fiber composite material/aluminum laminate is made without reinforcing fibers, that is, a plastic aluminum laminate. This forms a very strong and durable connection made of aluminum and an appropriate plastic, reference being made to the previous and further versions as well as the claims with regard to the plastic and aluminum.

Subsequently the invention will be explained in more detail using the following figures and embodiments.

There is shown in:

FIG. 1 *a*) a wire mesh made of AlMg5 with a permeability of 28% and b) a perforated plate made of AlMg3 with a permeability of 23%;

To check and demonstrate the mechanical properties of a laminate according to the invention, a sample is made from a commercially available GF (E-glass fiber non-crimp fabrics) scrim and several laminate samples are made from this GFRP and a metal layer. The metal layer is varied, specifically a 0.65 mm thick solid sheet made of AlMg3 (AA5754), a 0.65 mm thick perforated sheet (perforated sheet) as in FIG. 1 *b*) made of the same material and a wire mesh (Al fabric) made of AlMg5 (AA5019) as shown in FIG. 1 *a*) are used. The wire mesh has a wire diameter of 100 micrometers and a mesh size of also about 100 micrometers. The perforated plate can be produced from the solid plate by punching holes with a diameter of 1.5 mm with a hole spacing of 3 mm.

The laminate samples are produced using the Resin Transfer Molding (RTM) process. For this purpose, in one form, the fiberglass scrim together with one of the above-described metal layers is processed with an epoxy resin (RIMH 135/RIMR 137) as a matrix polymer at 30° C. for 48 h to form a laminate. With regard to the glass fibers, the laminates consist of a scrim with 90% fiber in the 0° direction and 10% fiber in the 90° direction. ($0^{90\%}$, $90^{10\%}$) in the "lay-up" always means a coherent glass fiber mat, from which the laminate is built up by stacking a predetermined sequence of such mats. Towards the middle of the laminate, the scrim is reversed ($90^{10\%}$, $0^{90\%}$) so that the 0° fiber direction lies in the central plane. Typical lay-ups of the samples produced here are [($0^{90\%}$, $90^{10\%}$)$_2$, ($90^{10\%}$, $0^{90\%}$)$_m$, Al, Al, ($0^{90\%}$, $90^{10\%}$)$_m$ ($90^{10\%}$, $0^{90\%}$)$_2$]$_s$ with m=3 when Al is the wire mesh, otherwise m=2, and s as the plane of symmetry.

The finished laminates are separated and scored into rectangular test strips in accordance with ASTM Standard D3846-02.

Figure 2:
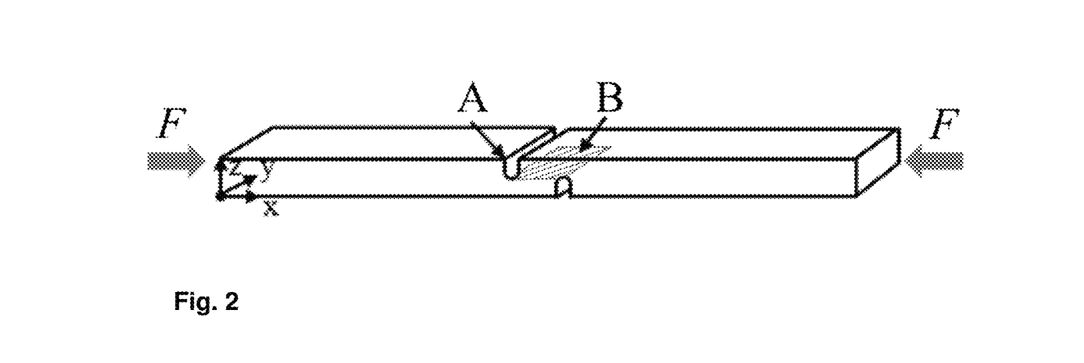
FIG. 2 a sketch of a test laminate provided for the application of force (compression) along the x-axis with notches A and inner shear surface B, the durability of which is checked.

The length axes of the test strips are either oriented so that they match the predetermined fiber orientation—0° samples—or run perpendicular to the fiber orientation—90° samples. FIG. 2 shows the test strips schematically. The longitudinal axis is always the x-axis into which the force is applied. After the laminates have been separated into test strips, the cut surfaces are polished using silicon carbide (SiC) abrasive paper. The individual strips are then post-cured for 15 hours at 80° C. To prevent re-absorption of moisture after drying, the test strips are stored in a desecrator for two weeks before the mechanical tests are carried out.

To determine the interlaminar shear strength of the various samples, a double notch shear (DNS) test is carried out according to the standard ASTM D-3846-08 method. For this purpose, all test strips are provided on both sides with a high-precision separating machine (see A in FIG. 2), which run perpendicular to the application of force. The metal layer—or GFRP or GFK layer for a pure GFRP or GFK sample—arranged in the central plane of a test strip must be completely cut through by the notches. Under the effect of compression along the x-axis, the test strips are then only loaded in the area of the hatched area (B in FIG. 2), which delamination is the preferred cause of failure.

Figure 3:
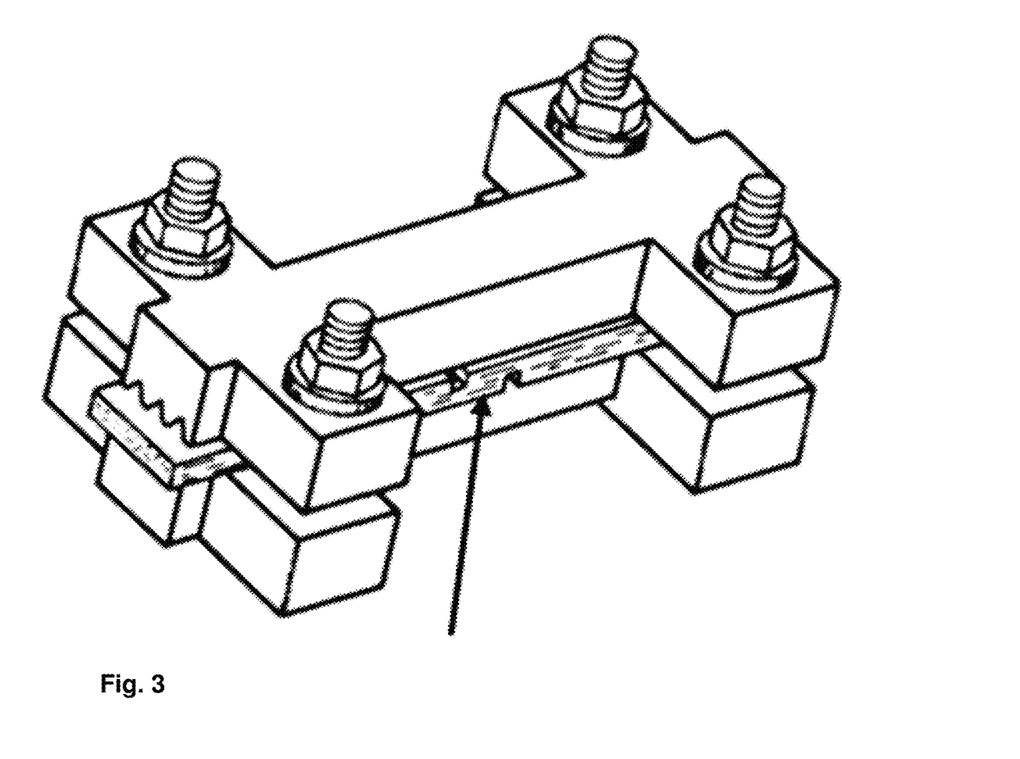
FIG. 3 a sketch of the sample holder for the laminate of FIG. 2 for use in the standard test ASTM D-3846-08.

FIG. 3 shows the sample holder for the load test according to ASTM standard D-3846-08. The upper and lower part of the holder prevent the test strips from evading the load caused by bending perpendicular to the direction of the force. The arrow points to a test strip that is notched and clamped.

After being clamped in the holder, the test strips are compressed mechanically along the longitudinal axis at a speed of 1.3 mm/min. The force required for the change in length Δl per cross-sectional area of the laminate is shown as shear strength σ in units N/mm$^2$=MPa in the following figures. In all figures, the measurement curves are marked with digits at their breakpoints—if the sample is destroyed. Each digit indicates the material being sampled, consistently as follows:

1=GFRP
2=GFRP+AlMg5 wire mesh ("mesh")
3=GFRP+AlMg3 perforated sheet ("perforated sheet")
4=GFRP+AlMg3 solid sheet ("full sheet")

Figure 5:
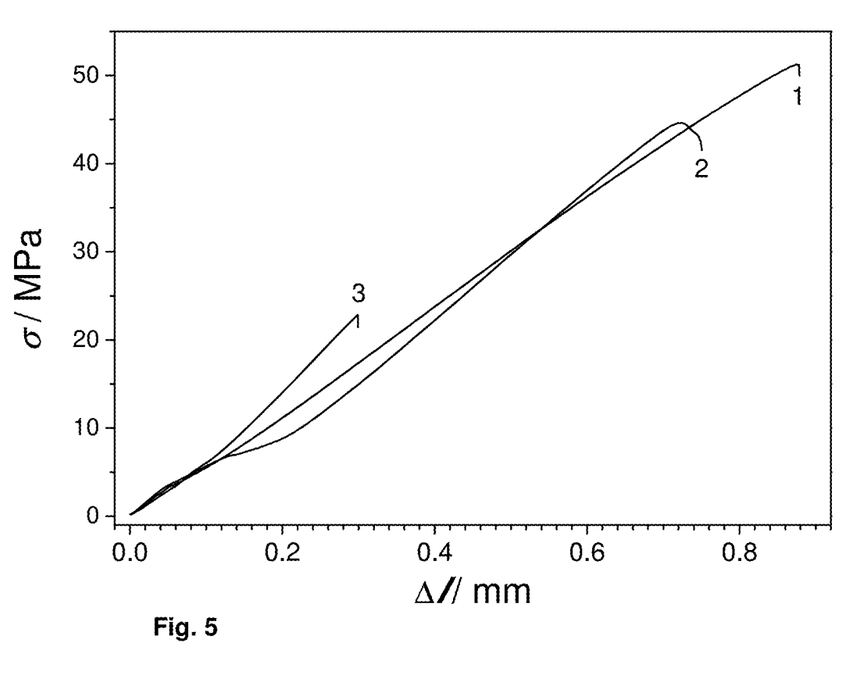
FIG. 5 measurement curves of an ASTM D-3846-08 test for (1) GFRP, (2) a laminate of GFRP and a wire mesh made of AlMg5 as in FIG. 1 *a*) and (3) a laminate of GFRP and a perforated plate made of AlMg3 as in FIG. 1 *b*), fibers aligned perpendicular to the application of force (90° orientation)

FIG. 4 shows the measurement results for the 0° samples and FIG. 5 shows the measurement results for the 90° samples in which the aluminum flat bodies have not been processed, i.e. do not have any anchoring structures. For this reason, the sample with the solid sheet (4) is also missing, since these test strips delaminate when they are cut. In both figures, however, the test strips with the perforated plate (3) show a significantly better resilience, in which the bridges made of matrix material extending through the holes prevent delamination for a while. The laminate with wire mesh (2) has an even higher number of such bridges, these bridges individually being much thinner than in the case of the laminate with perforated plate. The shear strength of the laminate with wire mesh (2) comes close to that of a pure GFRP laminate (1), but still clearly lags behind.

If the aluminum flat bodies are provided with anchoring structures at least on their flat sides, the situation is, for the person skilled in the art, unexpectedly completely reversed.

Figure 6:
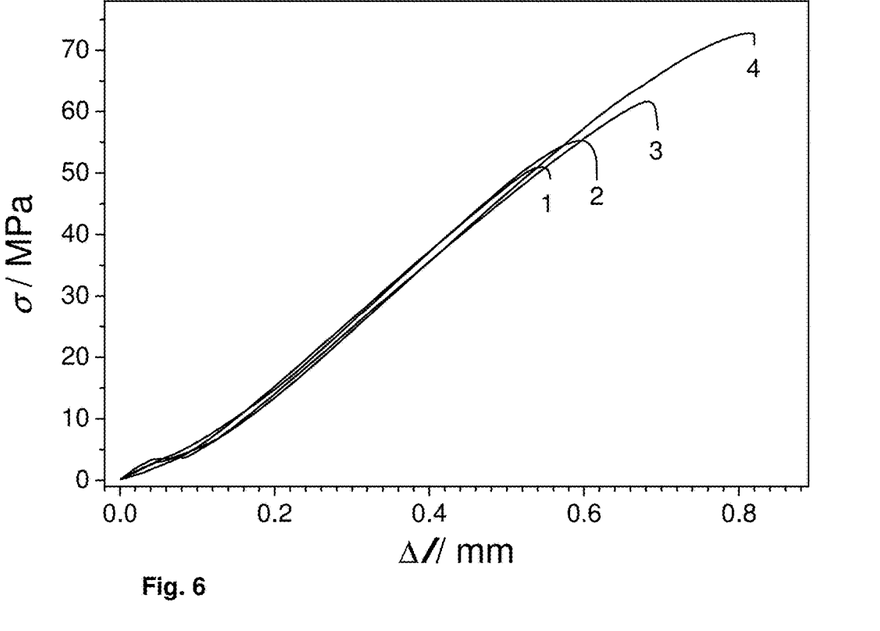
FIG. 6 measurement curves of an ASTM D-3846-08 test for (1) GFRP, (2) a laminate of GFRP and a wire mesh made of AlMg5 as in FIG. 1 *a*) and (3) a laminate of GFRP and a perforated plate made of AlMg3 as in FIG. 1 *b*) and (4) a laminate of GFRP and a solid sheet of AlMg3, fibers aligned along the application of force (0° orientation), all metal bodies provided with anchoring structures
and FIG. 7 measurement curves of an ASTM D-3846-08 test for (1) GFRP, (2) a laminate of GFRP and a wire mesh made of AlMg5 as in FIG. 1 *a*) and (3) a laminate of GFRP and a perforated plate made of AlMg3 as in FIG. 1 *b*) and (4) a laminate of GFRP and a solid sheet of AlMg3, fibers oriented perpendicular to the force application (90° orientation), all metal bodies provided with anchoring structures.
Figure 7:
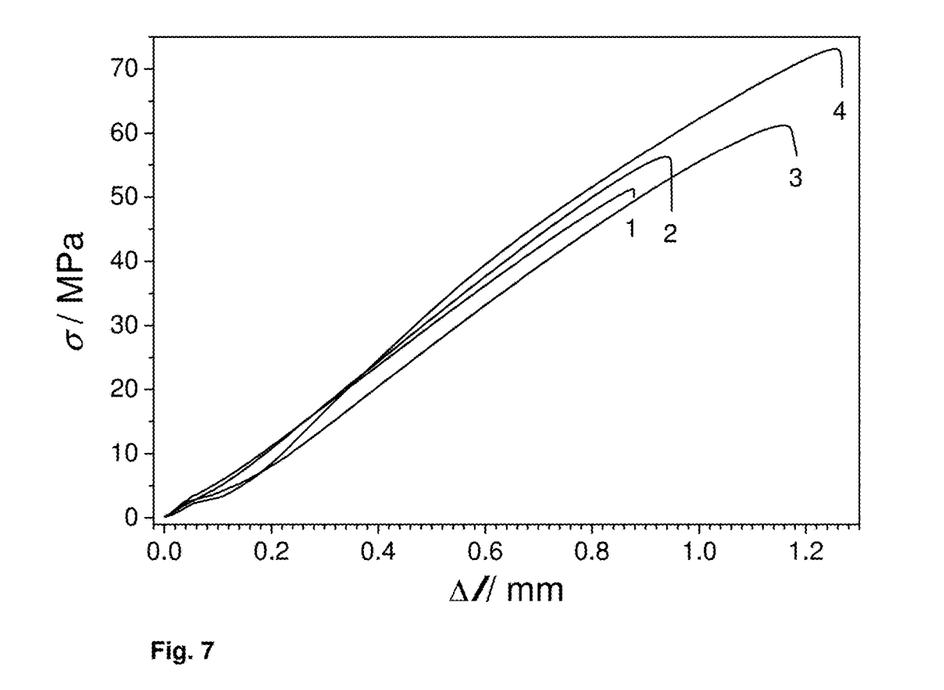

FIGS. 6 and 7 show the measurement curves for laminate test strips (2-4) according to the invention in comparison with the data for GFRP laminate (1) (the same as in FIGS. 4 and 5). FIG. 6 shows measurement data for the 0° samples, and FIG. 7 shows the measurement data for the 90° samples.

All laminates containing the etched aluminum flat bodies can now be compressed further and withstand higher shear forces until failure than the pure GFRP laminate (1). The laminate with wire mesh (2) already shows a slight improvement compared to (1), but the effects become very clear with the laminates with the perforated plate (3) and the solid plate (4). Ironically, the laminate with solid sheet (4), whose counterpart was not even suitable for testing without anchoring structures, now shows a shear strength of up to over 70 MPa, which means an increase of around 40% compared to pure GFRP. In fact, the RIMR 135/RIMH 137 matrix material does not separate from the metal even then, but is itself torn. A corresponding tensile strength of 60-75 MPa can be found in the material's data sheet.

In addition, it should be noted at this point that fiber-matrix detachments can occur, which can take place due to the "low" fiber-matrix adhesion.

The subsequent inspection of all destroyed test strips confirms that the adhesion to the metal has not failed anywhere. Rather, all cracks run in the fiber composite material. This means that it is now easier to remove individual fibers from their embedding than to end the adherence of the metal to the fiber composite material.

In other words, the previously valid thickness limitation for metal layers in laminates, which should ensure that forces from the fiber composite material pass into the metal without delamination, is now obsolete. Delamination can now only occur if the matrix material of the fiber composite material fails under mechanical load, whereby it is often torn, i.e. the matrix material or the fiber-matrix connection is now the weakest link in the chain, and no longer the matrix-metal adhesion.

The invention claimed is:

1. A plastic fiber composite material/aluminum laminate comprising:
   at least one flat body made of aluminum and/or an aluminum alloy, and
   a plastic fiber composite material with a matrix material that has an initially temporarily flowable state, at least under the influence of temperature, and then a hardened state, wherein the at least one flat body and the plastic fiber composite material have at least one common composite surface and are connected to one another via this common composite surface, wherein the at least one flat body has chemically and/or electrochemically etched anchoring structures at least on all common composite surfaces to the plastic fiber composite material, wherein the anchoring structures are formed by a sculpturing process, wherein the anchoring structures have a shape tapering towards the surface and are comprised of cubic elements of different sizes and have areas with free volume, which are covered by multiple cubic aluminum structures, and wherein the anchoring structures have steps and undercuts, the anchoring structures being filled and/or enclosed by the matrix material of the plastic fiber composite material.

2. The plastic fiber composite material/aluminum laminate according to claim 1, wherein the at least one flat body is arranged on the outside and/or inside of the laminate.

3. The plastic fiber composite material/aluminum laminate according to claim 1, wherein at least one flat body is arranged within the plastic fiber composite material.

4. The plastic fiber composite material/aluminum laminate according to claim 3, wherein the at least one flat body or the at least one flat bodies is or are arranged between layers of the plastic fiber composite material produced in a layer structure.

5. The plastic fiber composite material/aluminum laminate according to claim 1, wherein when force is introduced into the plastic fiber composite material/aluminum laminate, the matrix material of the fiber composite material or the fiber matrix bond fails under mechanical load before detachment of the fiber composite material from the at least one flat body takes place.

6. The plastic fiber composite material/aluminum laminate according to claim 1, wherein the at least one flat bodies made of aluminum or aluminum alloy have a volume greater than 1 cubic centimeter and a thickness of at least 30 micrometers.

7. The plastic fiber composite material/aluminum laminate according to claim 1, wherein the plastic fiber composite material is a glass fiber reinforced and/or carbon fiber reinforced epoxy resin.

8. The plastic fiber composite material/aluminum laminate according to claim 1, wherein the at least one flat bodies made of aluminum or aluminum alloy have a volume greater than 1 cubic centimeter and a thickness of at least 100 micrometers.

9. The plastic fiber composite material/aluminum laminate according to claim 1, wherein the at least one flat bodies made of aluminum or aluminum alloy have a volume greater than 1 cubic centimeter and a thickness of at least 500 micrometers.

10. A plastic fiber composite material/aluminum laminate comprising:
    at least one flat body made of aluminum and/or an aluminum alloy, and
    a plastic fiber composite material with a matrix material that has an initially temporarily flowable state, at least under the influence of temperature, and then a hardened state, wherein the at least one flat body and the plastic fiber composite material have at least one common composite surface and are connected to one another via this common composite surface, wherein the at least one flat body has chemically and/or electrochemically etched anchoring structures at least on all common composite surfaces to the plastic fiber composite material, wherein the anchoring structures are formed by a sculpturing process, wherein the anchoring structures have a shape tapering towards the surface and are comprised of cubic elements of different sizes and have areas with free volume, which are covered by multiple cubic aluminum structures, and wherein the anchoring structures have steps and undercuts, the anchoring structures being filled and/or enclosed by the matrix material of the plastic fiber composite material, and wherein the adhesion at the interface of the plastic fiber composite material/aluminum laminate is higher than the shear strength and tensile strength of the plastic or the shear strength and tensile strength of the aluminum or aluminum alloy.

11. A plastic fiber composite material/aluminum laminate, produced by the process comprising the following steps:

a) providing at least one flat body made of aluminum and/or an aluminum alloy;
b) processing at least one surface of the at least one flat body into a composite surface by etching using a sculpturing method for producing etched anchoring structures in the at least one composite surface of the at least one flat body, wherein the anchoring structures have steps and undercuts and have have a shape tapering towards the surface and are comprised of cubic elements of different sizes and have areas with free volume, which are covered by multiple cubic aluminum structures;
c1) applying a matrix material of a plastic fiber composite material, which is initially flowable or at least temporarily under the influence of temperature, for the production of the laminate on the at least one composite surface, the matrix material of the plastic fiber composite material filling and/or enclosing the anchoring structures, or
c2) applying an initially flowable adhesive and then curing on the at least one composite surface and then, before the adhesive has hardened, applying a prefabricated, hardened laminate.

* * * * *